United States Patent [19]

Unkauf

[11] 4,109,100
[45] Aug. 22, 1978

[54] REVERBERATION COMPENSATING COMMUNICATION SYSTEM

[75] Inventor: Manfred G. Unkauf, Franklin, Mass.

[73] Assignee: Raytheon Company, Lexington, Mass.

[21] Appl. No.: 720,913

[22] Filed: Sep. 7, 1976

[51] Int. Cl.² ............................................. H04L 27/24
[52] U.S. Cl. ...................................... 178/67; 325/42; 325/56; 325/65
[58] Field of Search ....................... 325/56, 41, 42, 63, 325/65; 178/67

[56] References Cited

U.S. PATENT DOCUMENTS

| | | | |
|---|---|---|---|
| 2,982,853 | 5/1961 | Price et al. | 325/65 |
| 3,168,699 | 2/1965 | Sunstein | 325/65 |
| 3,423,729 | 1/1969 | Heller | 325/41 |
| 3,537,008 | 10/1970 | Lakatos | 325/65 |
| 3,742,440 | 6/1973 | Ehrlich | 325/65 |
| 3,757,221 | 9/1973 | Moehrmann | 325/65 |
| 3,780,279 | 12/1973 | Stover | 325/65 |
| 4,017,798 | 9/1977 | Gordy | 325/42 |

FOREIGN PATENT DOCUMENTS 2,325,023  11/1974  Fed. Rep. of Germany ............. 325/42

*Primary Examiner*—Benedict V. Safourek
*Assistant Examiner*—Michael A. Masinick
*Attorney, Agent, or Firm*—David M. Warren; Joseph D. Pannone; Milton D. Bartlett

[57] ABSTRACT

A system for transmitting a signal through a reverberant environment characterized by multipath communication which causes dispersion and fading of the signal. The signal is phase modulated onto a carrier which is also modulated by a repeating series of digital pseudo noise code words. The length of each word is equal to the length of a symbol of the signal and synchronized thereto, individual symbols being of shorter duration than the signal fading time. A receiver views symbols via a selector switch which serves as a window for successively viewing portions of substantially identical reverberation patterns of each symbol. A set of matched filters coupled to the selector switch sequentially demodulates the code words to provide a repeating sequence of pulses of amplitude modulated carrier these amplitude modulated pulses having symbol data thereon and being applied to a delay locked loop for the generation of a reference signal for recovering the symbols.

5 Claims, 9 Drawing Figures

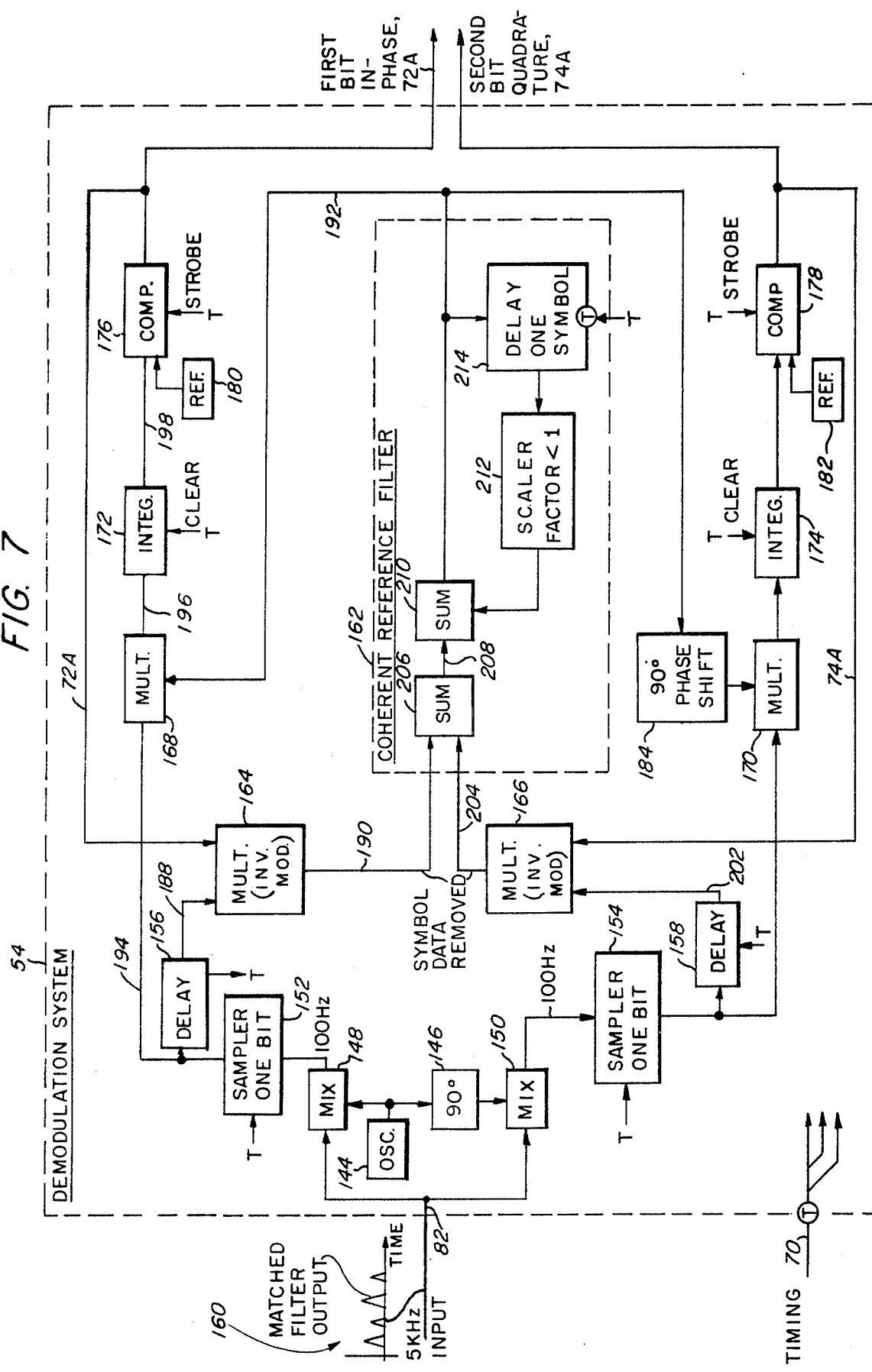

REVERBERATION COMPENSATING COMMUNICATION SYSTEM

BACKGROUND OF THE INVENTION

This invention relates to a communication system and, more particularly, to a communication system which is adapted to reduce the effect of reverberations upon the quality of signal transmission.

Certain environments are known to produce reverberation on signal transmission paths. For example radio frequency transmission of signals in a mountainous region experience reflections from the mountains with resulting multipath communication of the signals between a point of transmission of the signals and a point of reception of the signals. Slight variations in the lengths of propagation paths, as may be induced by perturbations in the atmosphere, result in a composite signal at the point of reception which tends to fade in amplitude as the phases of the signals on the various propagation paths vary with respect to each other. A similar, but more intense, situation exists in underwater communication in which sonic energy reflects off surfaces of submerged objects, refracts off thermoclines, and is selectively absorbed in some media such as the ocean bottom. The length of sonic vibrations in an underwater environment are often so long as to have precluded all but the slowest rates of communication.

In the past, attempts have been made to negate the effects of reverberation by multiple tone signaling at very slow data rates, these data rates being slower than the signal fading rate. By means of the multiple tone or multiple channel signaling systems, increased data rates have been obtained at a cost of an increased number of channels. However, heretofore it has not been possible to obtain a data rate, which is higher than the signal fading rate by means of a single tone or single channel system.

SUMMARY OF THE INVENTION

The aforementioned problem is overcome and other advantages are provided by a communication system, operative in a reverberative environment, which provides for the propagation of a message along a single channel at a rate substantially higher than the rate of fading induced by reverberations. In accordance with the invention, each symbol of the message is modulated by a code word of a set of code words, individual ones of the code words being used sequentially for sequentially occurring symbols. The modulated symbols are transmitted to a receiver which includes a filter system providing filter functions which are matched to individual ones of the code words. The filter functions are sequentially applied to the corresponding code modulations as they appear on received symbols and serve to demodulate the code modulation from each of the received symbols. Each filter function is utilized for a predetermined amount of time, hereinafter to be sometimes referred to as a window, the size of the window being such as to admit matched filter output signals resulting from a number of multipath signal transmissions, the number being the same for each of the symbols and each of the code words. Thereby, a set of matched filter output signals having a periodic format is produced by the filter system. This periodic format is utilized in the generation of a reference signal via a delay locked loop for detecting individual ones of the symbols.

In a preferred embodiment of the invention, the message to be transmitted is in a digital format having two bits providing a total of four possible symbols to be utilized in the message. The symbols are phase modulated onto a carrier by a four-phase modulation operation known as quaternary phase shift keying in which the carrier experiences four possible phase shifts. Alternatively, a three bit (or higher number of bits) digital signal with eight (or higher multiple of 2) phases of the carrier may be utilized. The carrier is also phase modulated with the code words via a one bit modulation having two possible phase states of the carrier, the code word modulation being synchronized with the modulation of the symbols such that one code word occurs contemporaneously with each symbol. Thus, the transmitted signal has a composite modulation of the symbol modulation plus the code word modulation. The repetition frequency of the pulses of a code word occur at a faster rate than do the symbols, by way of example, a hundred pulses of the code being applied during the duration of one symbol of the message in the preferred embodiments of the invention. Accordingly, the code modulation greatly increases the bandwidth of the transmitted symbols, and makes possible a fine discrimination in the temporal occurrences of received symbols and reverberations thereof.

Recalling that, in the reverberant environment there are several paths over which the message is being simultaneously transmitted from the transmitter to the receiver, it is noted that these paths may be regarded as substantially stationary during the transmission of a plurality of symbols of the message in the present situation, since it is understood that the symbol rate provided by the invention is higher than the fading rate of the communication channel. This relationship between the symbol rate and the fading rate exists even in the case of a ship traveling in a harbor or bay in which the relative locations of the ship and points of reflection within the water are constantly changing. In view of this situation wherein the multiple transmission paths may be considered as being stationary during the occurrence of a plurality of symbols, preferably a dozen or more symbols, and in view of the fact that a common oscillator is utilized in the generation of the signals along each of the multiple transmission paths, it becomes apparent that during the occurrence of the foregoing plurality of symbols there is sufficient coherence in the received signal from symbol to symbol to permit the generation of reference signal for demodulating and detecting received symbols.

The receiver comprises a set of matched filters which are individually selected in correspondence with individual ones of the code words, or alternatively, a single filter having a filter function which is sequentially altered to match the corresponding code words. Each matched filter produces a set of output pulses, individual ones of the output pulses being of much shorter duration than the code word in accordance with the bandwidth of the code word as is known from matched filter and correlation technology. Such filters are also referred to as pulse compression filters. The set of narrow output pulses corresponds to the set of signal transmission along the multiple paths of the communication channel with individual output pulses occurring sequentially according to the relative lengths of the multiple transmission paths. In particular, it is noted that the set of multiple paths are invariant with respect to the code words so that the envelope of the output pulse train of one matched filter is the same as that produced by a second of the matched filters. The output pulse train of each matched filter is observed during an interval of time equal in length to the duration of a symbol of the transmitted message. Since the duration of a symbol is less than the channel dispersion time, only a fraction of the output pulse train from each of the matched filters is observed. The envelopes of the partial trains of pulses from each of the matched filters have the same form.

A reference generator comprising a delay locked loop utilizes the partial output pulse trains from the matched filters to generate a reference signal, the delay in the loop being equal to the length of one symbol. In this way, the successive occurrences of the pulse trains having the common envelope and a substantially uniform phase characteristic from one pulse train to the next are summed together to produce the reference signal. Quadrature and inphase channels are used for inversely modulating the received signals with the symbol modulation to produce the reference signal via a feedback loop arrangement in which the reference signal is utilized for the detection of the inphase and quadrature components corresponding to first and second bits of each symbol.

BRIEF DESCRIPTION OF THE DRAWINGS

The aforementioned aspects and other features of the invention are explained in the following description taken in connection with the accompanying drawings wherein:

FIG. 7 is a block diagram of a demodulation system of FIG. 1 including a circuit for producing a reference signal for detecting the symbols of the message;

DESCRIPTION OF THE PREFERRED EMBODIMENT

Figure 1:
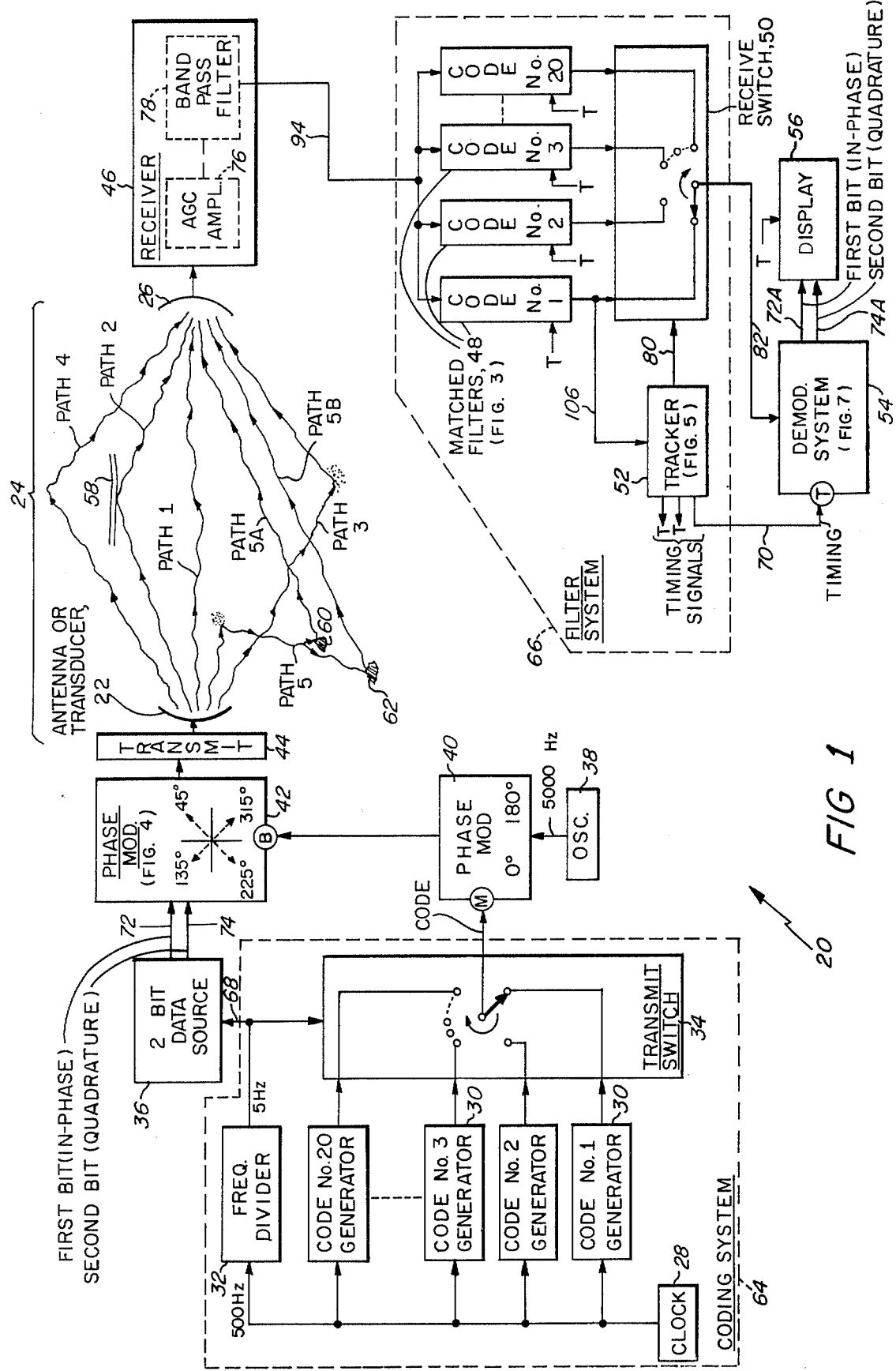
FIG. 1 is a block diagram of the communication system of the invention showing a succession of code generators for successively modulating symbols of the message with successively differing codes, the figure also showing a set of matched filters corresponding to each of the code words for selectively filtering each of the code words.

Referring now to FIG. 1, there is seen a system 20 which, in accordance with the invention, transmits a coded signal from an antenna 22 via a reverberant channel 24 to a receiving antenna 26. In the situation wherein the channel 24 represents the propagation of sonic energy in an underwater environment, the antennas 22 and 26 would be fabricated from arrays of sonar transducers. The signal generating equipment coupled to the transmitting antenna 22 is seen to comprise a clock 28, code generators 30, a frequency divider 32, a switch 34, a source 36 of data, an oscillator 38, phase modulators 40 and 42, and a transmitter 44. The signal processing equipment coupled to the receiving antenna 26 is seen to comprise a receiver 46, filters 48, a switch 50, a tracker 52, a demodulation system 54 and a display 56.

The channel 24 is portrayed as consisting of several paths of propagation of radiant energy, path #1 representing the shortest propagation time between the antennas 22 and 26. The paths #2, #3 and #4 represent successively longer propagation distances and propagation times between the antennas 22 and 26. By way of example in the underwater sound situation, path #2 is shown refracting off an interface 58 between layers of water of differing temperatures. Also, by way of example, path #5 is shown being split by rocks 60 and 62 and reflected as paths #5A and #5B. In the event that the channel 24 represents the propagation of electromagnetic energy in the atmosphere, refraction may occur at the interfaces between differing ionospheric layers while reflection may take place from mountains or other obstructions.

The code generators 30 in combination with the clock 28, the frequency divider 32 and the switch 34 comprise a coding system 64 for modulating the phase of a carrier produced by the oscillator 38 with a succession of code words while the filters 48 in combination with the tracker 52 and the switch 50 comprise a filter system 66 for demodulating the code words from the aforementioned carrier. The succession of code words produced by the coding system 64 may be referred to as a frame, the number of code words in the frame being sufficient to insure that the duration of the frame is greater than the difference in propagation times between the longest and shortest paths of the channel 24. By way of example, the coding system 64 has twenty generators 30 for producing twenty different code words, the particular word to be transmitted during any one interval of time being selected by the switch 34 which is seen to have twenty input terminals coupled to the respective ones of the generators 30 and one output terminal coupled to the modulator 40. The coding system 64 also provides timing signals on line 68 for synchronizing the operation of the data source 36 with the operation of the coding system 64. The number of filters 48 is equal to the number of generations 30, individual ones of the filters 48 having filter functions corresponding to the code words of individual ones of the generators 30 with the filter functions of the filters 48 being matched to the corresponding code word modulations produced by the corresponding generators 30. The switch 50 operates in the same manner as does the switch 34 for selectively coupling individual ones of the filters 48 to the demodulation system 54. Timing signals are provided by the filter system 66 on line 70 for synchronizing the operation of the demodulation system 54 to the operation of the filter system 66.

The source 36 provides data in a digital format via lines 72 and 74 to the modulator 40 to be modulated onto the carrier for transmission via the channel 24. The digital data is in a two bit format in which the first bit appears on line 72 and the second bit appears on line 74.

The digital data is then recovered from the received carrier by the demodulation system 54 whereupon the first and second bits thereof are coupled respectively via the lines 72A and 74A to the display 56. The modulator 42, as will be described hereinafter, modulates the digital data via quaternary phase shift keying onto the carrier produced by the oscillator 38, the carrier then being phase modulated with both the code word produced by the coding system 64 and the data of the source 36.

By way of example, the duration of the code frame in a typical underwater situation is 4 seconds and, being composed of twenty words, provides a word duration of 0.2 seconds. Each twobit symbol of data produced by the source 36 is of equal duration to a code word and is, accordingly, 0.2 seconds in duration. The data rate is thus five two-bit symbols per second or 10 bits per second. Each code word produced by a generator 30 consists of 100 digital pulses for a pulsing rate of 500 pulses per second. A carrier frequency of 5000 Hertz provided by the oscillator 38. The code words applied by a switch 34 to terminal M of the modulator 40 comprise one bit symbols and accordingly, the modulator 40 is a one bit modulator producing phase angles of 0° or 180° while the modulator 42 produces four possible phase states, namely, 45°, 135°, 225° and 315°. It is noted that the positions of the modulators 40 and 42 may be interchanged such that the data symbol modulation by the modulator 42 is first applied to the carrier of the oscillator 38 followed by the phase modulation of the code words by the modulator 40.

Continuing with the foregoing example, it is assumed that the dispersion time, or difference between the propagation times of the longest and shortest paths of the channel 24, is on the order of one second. Thus, it is seen that the data symbols of the source 36 which occur at a rate of five symbols per second are of a sufficiently short duration such that a plurality of the symbols are received at the antenna 26 during an interval equal to the dispersion time. Furthermore the twenty code words in a frame of the code which collectively have an elapsed time of 4 seconds provide a frame duration while in excess of the dispersion time so that no ambiguity as to code word exists at the filter system 66. Accordingly, the filter system 66 is able to correlate received signals over an interval of time that is longer than the dispersion time of the communication channel while the demodulation system 54 demodulates data symbols having a duration which is less than the dispersion time of the communication channel 24.

In operation, therefore, the clock 28 drives the code generators 30 at a rate of 500 pulses per second. Each generator 30 produces a pseudo noise code and may have a structure similar to that taught in FIGS. 4 and 5 of the U.S. Pat. No. 3,818,478 which issued in the name of H. L. Groginsky on June 18, 1974. The divider 32 produces a 5 Hertz clock pulse signal on line 68 in synchronism with the 500 Hertz clock pulse signal of the clock 28. The signal on line 68 in addition to driving the source 36, also drives the switch 34 to sequentially select a code word to be modulated onto the carrier of the oscillator 38 in synchronism with the modulation of the data symbol on that carrier. The resultant signal presented to the transmitter 44 thus comprises a four-phase modulation at a relatively slow rate of 5 symbols per second superimposed upon a one bit modulation at a relatively high rate of 500 pulses per second. The transmitter 44 couples this signal to the antenna 22 and amplifies the signal to a sufficient power for transmission through the channel 24 to the antenna 26. The receiver 46 is coupled to the receiving antenna 26 and includes an amplifier 76 having an automatic gain control for producing a relatively constant value of received signal independently of variations of the amplitude of the signal as received at the antenna 26, the receiver 46 also having a filter 78 having a passband commensurate with the bandwidth of the signal transmitted by the transmitter 44 for attenuating noise, such as that produced by the ocean, falling within a spectral zone outside of the signal bandwidth. The tracker 52, as will be explained hereinafter, tracks the occurrences of the output signals of the first of the filters 48, these signals being produced in response to the occurrence of the code word produced by the first of the generators 30. The operation of the tracker 52 is thereby synchronized with the occurrence of the code word of the first of the generators 30 and is thereby able, via signals applied on line 80, to operate the switch 50 in synchronism with the switch 34. The succession of correlation type output signals from each of the matched filters 48 is coupled from the switch 50 along line 82 to the demodulation system 54 whereupon the symbols of the source 36 are recovered to be displayed on the display 56.

Figure 2:
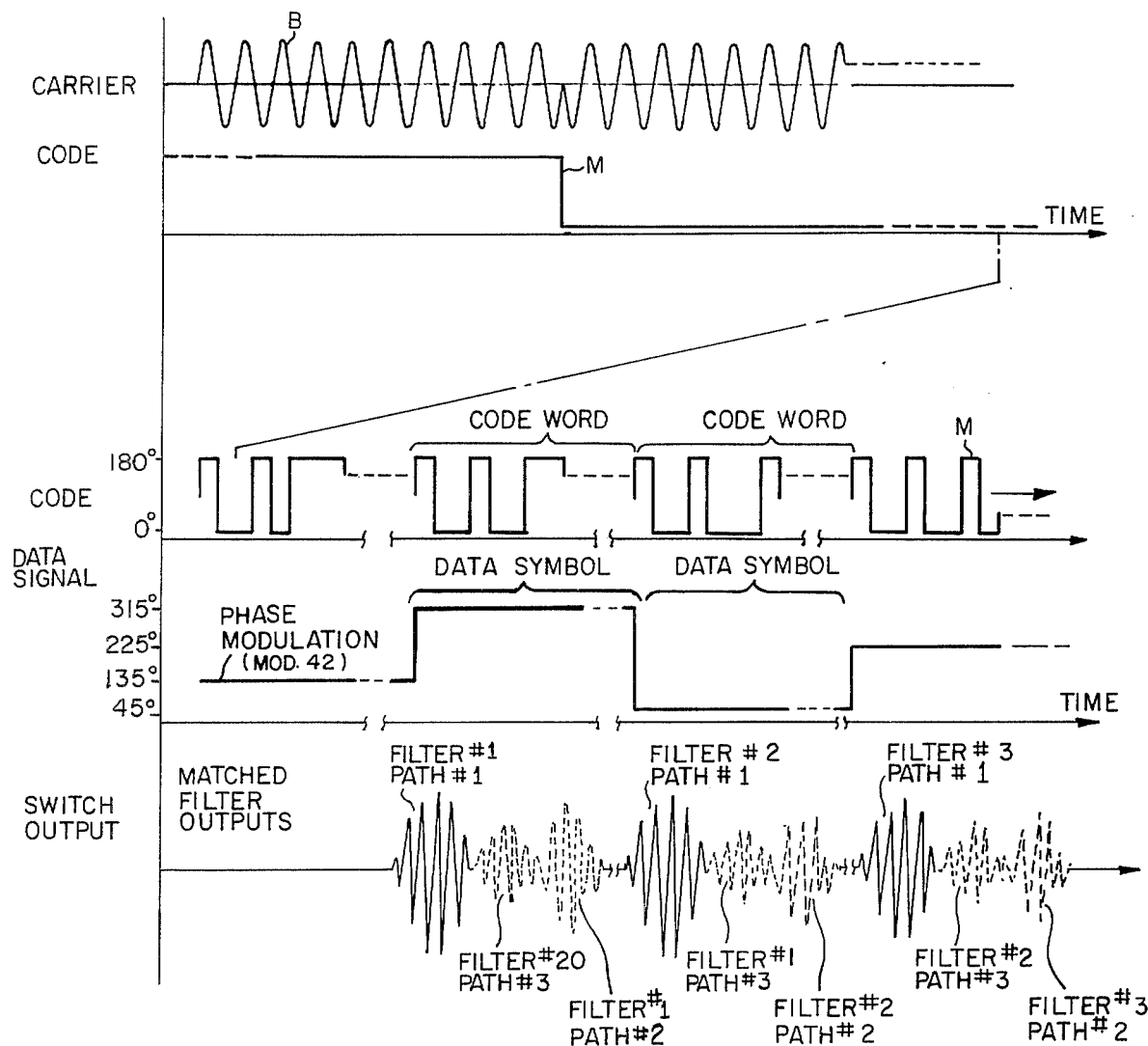
FIG. 2 is a timing diagram of waveforms of signals produced in FIG. 1.

Referring now to FIG. 2, the first graph shows a representation of the carrier applied by the oscillator 38 via the modulator 40 to terminal B of the modulator 42. The second graph shows a pulse of a code word applied to terminal M of the modulator 40. It is noted that at the transition point, where the waveform of a code pulse changes from a relatively high voltage representing a logic state of 1 to a relatively low voltage representing a logic state of 0, the carrier undergoes a change in phase of 180°. The third graph of FIG. 2 shows a continuation of the second graph, but compacted in scale so as to show portions of a few code words. The identifying legends, B and M, in the first three graphs correspond to the terminals B and M of the modulators of FIG. 1.

The fourth graph represents the phase modulation applied by the modulator 42 to the carrier in response to symbols for the data of the source 36. The time scale of the fourth graph corresponds to the time scale of the third graph and shows that a leading edge of each data symbol coincides with the leading edge of each code word, there being one code word during the interval of time occupied by one data symbol. The fourth graph also shows the magnitude of the phase shift imparted by the modulator 42 to the carrier, there being four possible values of phase shift as was disclosed previously with reference to FIG. 1. The third graph also shows the phase shift, either 0° or 180°, resulting from the code word signal at terminal M. Thus, it is seen that the total phase shift applied to the carrier by the two modulators 40 and 42 is the sum of the phase shifts depicted in the third and fourth graphs.

The third and fourth graphs also demonstrate that the invention may be utilized to communicate data at a slower data rate. For example, pairs of data symbols of the fourth graph might be used in redundant fashion to express the same data but at a rate of one-half the original data rate. Thus, it is seen that one, two, or more code words may be utilized for each unit of data transmitted via the channel 24 of FIG. 1.

The bottom graph of FIG. 2 shows output signals from the filters 48 of FIG. 1. The envelope of each output signal has the format of a carrier with its amplitude modulated by a narrow pulse with side lobes of greatly reduced amplitude as is known to be produced by correlators and matched filters. In particular, it is noted that the envelopes of the respective output signals of each of the filters are the same except for the negligible influence of cross modulation products resulting from the spurious response of a filter to a code word other than that to which the filter is matched. It is also noted that the output signals resulting from code words transmitted along path #1 of the channel 24 occur in synchronism with the transmissions of the corresponding code words. A code word propagating along path #2 is also shown in the graph, it being seen that the filter output signal for that code word is delayed from the occurrence of the output signal produced in response to the code word transmitted via path #1. A filter output signal resulting from a code word propagating along path #3 is produced still later. Thus, as is seen in the bottom graph, a succession of output pulses for each filter results from the multipath transmission of the code word to which the filter is matched. It is also noted that the envelopes of the pulse trains for each of the filters are identical. The modulation produced by the data symbols at the modulator 42 occurs at a much lower rate than the modulation of the code words and is, accordingly, outside the passband of a matched filter. Thus, the envelopes of the pulses in the bottom graph are not influenced by the data symbol modulation.

Figure 3:
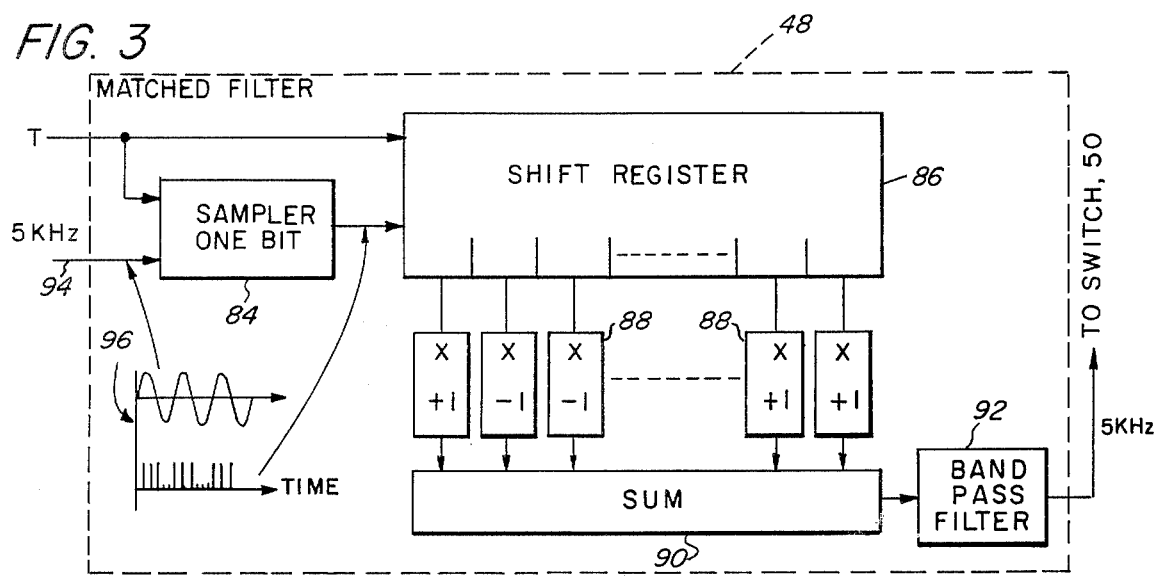
FIG. 3 is a block diagram of a matched filter of FIG. 1.

Referring now to FIG. 3, there is seen a block diagram of a matched filter 48 of FIG. 1. The matched filter 48 comprises a sampler 84, a shift register 86, multipliers 88, a summer 90, and a bandpass filter 92. The sampler 84 and register 86 are clocked by timing signals at terminal T provided by the tracker 52, the tracker 52 to be described hereinafter with reference to FIG. 5. The sampler 84 converts the analog signal, produced by the receiver 46 on line 94, to a digital signal which is readily processed by the register 86. Since the pulses of the code words occur at a rate of 500 pulses a second while the carrier frequency is 5 KHz, the code word modulation is adequately preserved by utilizing a one bit sampling of the signal on line 94. A graph 96 portrays the one bit sampling situation for a sampling frequency of 30 KHz. Therein, it is seen that a succession of three pulses, each having a logic state of 1, occurs repetitively and is spaced apart by a succession of pulses having logic states of 0. The format of the digital pulse train follows the phase pattern of the carrier and thereby reproduces the phase modulation of a digital format. The pulse train produced by the sampler 84 is clocked into the register 86, the individual pulses being sequentially shifted from cell to cell of the register 86 as new pulses are entered into the register 86.

The register 86 is provided with a set of output terminals for each of its cells whereby the individual cells are coupled via individual ones of the multipliers 88 to the summer 90. Each of the multipliers 88 provides a multiplying factor of either +1 or −1 in accordance with a prescribed format to provide the filter function wherein the filter 48 is matched to a specific one of the code words. It is recognized that earlier occurring pulses appear in the right-hand cells of the register 86 while latter occurring pulses appear in the left-hand cells of the register 86. The simultaneous scaling of the pulses which have occurred at differing times, and their subsequent summation by the summer 90 produces the structure of a transversal filter. Accordingly, the register 86, the multipliers 88 and the summer 90 function in a manner of a transversal filter to produce a digital output signal which represents the matched filtering of a code word or the autocorrelation of the code word against a replica of the code word which is inherent in the scaling factors of the multipliers 88. Since one bit samples are utilized, the logic state of 1 is retained when the scale factor of the multiplier 88 is positive while the complement appears when the scale factor of the multiplier 88 is negative. Thus, the output of the summer 90 which, by way of example is presumed to be an analog summer, produces at its output terminal a succession of pulses of differing amplitudes. The filter 92 which is coupled to the output terminal of the summer 90 has a passband which is wide enough to pass the 5 KHz carrier but has an upper frequency cutoff which is well below the sampling frequency of 30 KHz. As a result, the output signal of the filter 92 is an analog signal in the form of a 5 KHz sinusoid having an amplitude modulation in the form of the narrow pulse disclosed in the bottom graph of FIG. 2.

Figure 4:
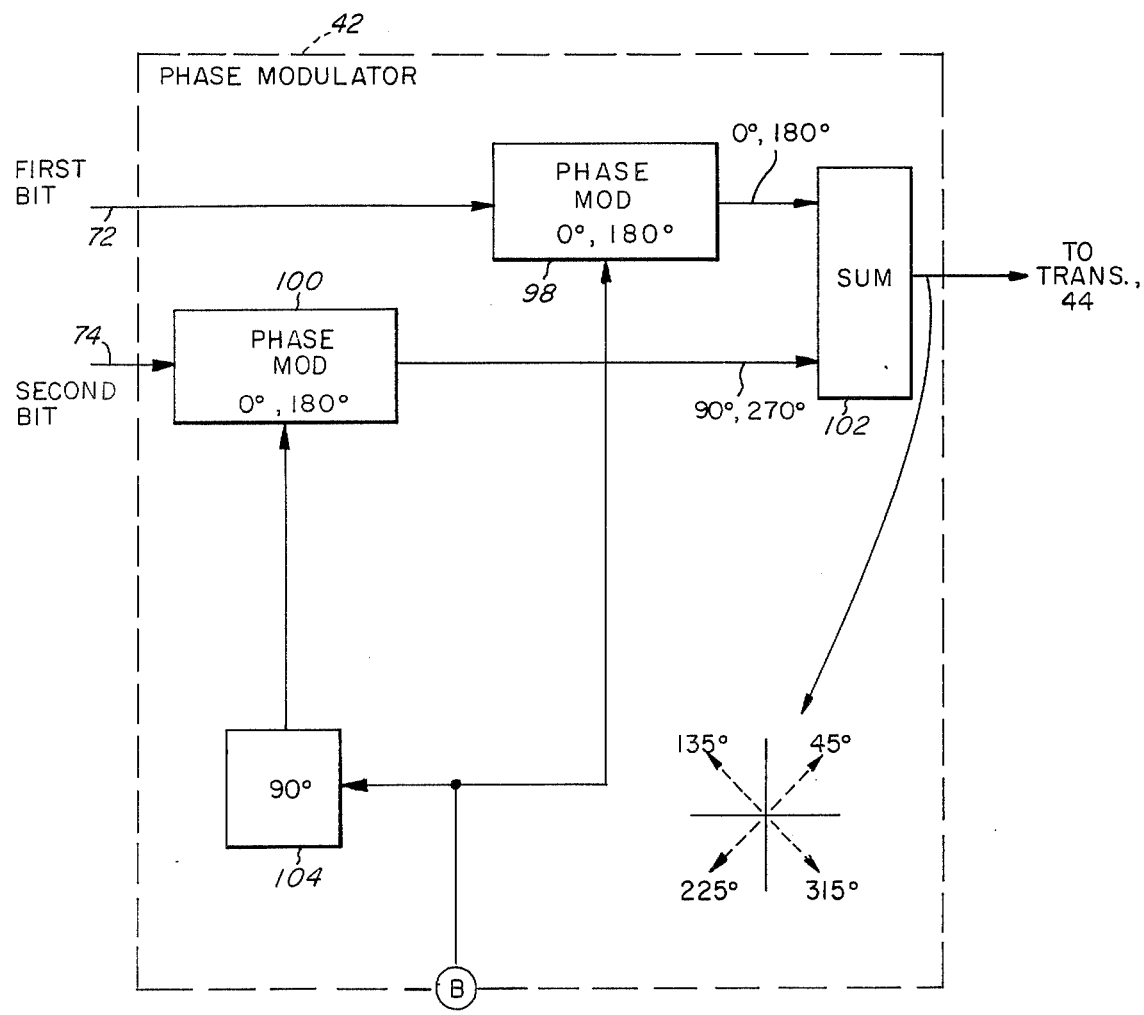
FIG. 4 is a block diagram of a phase modulator of FIG. 1.

Referring now to FIG. 4, there is shown a block diagram of the phase modulator 42 which, as disclosed in FIG. 1, produces quaternary phase keying of the carrier. The modulator 42 comprises two phase modulators 98 and 100 which operate in a manner identical to that previously described with reference to the phase modulator 40 of FIG. 1, a summer 102, and a 90° phase shifter 104. The carrier appearing at terminal B is applied to the modulator 98 wherein it is modulated by the digital signal on line 72. The carrier at terminal B is also applied via the phase shifter 104 to the modulator 100 wherein it is modulated by the digital signal on line 74. The phase shifter 104 applies a 90° phase shift to the carrier and, accordingly, the resultant phases appearing at the outputs of the modulators 98 and 100 differ by 90°, there being phase states of 0° and 180° appearing at the output of the modulator 98 while phase states of 90° and 270° appear at the output of the modulator 100. The summation of the output signals of the modulators 98 and 100 by the summer 102 produce the resultant phase states as represented by the vector diagram shown in the modulator 42 of FIG. 1.

Figure 5:
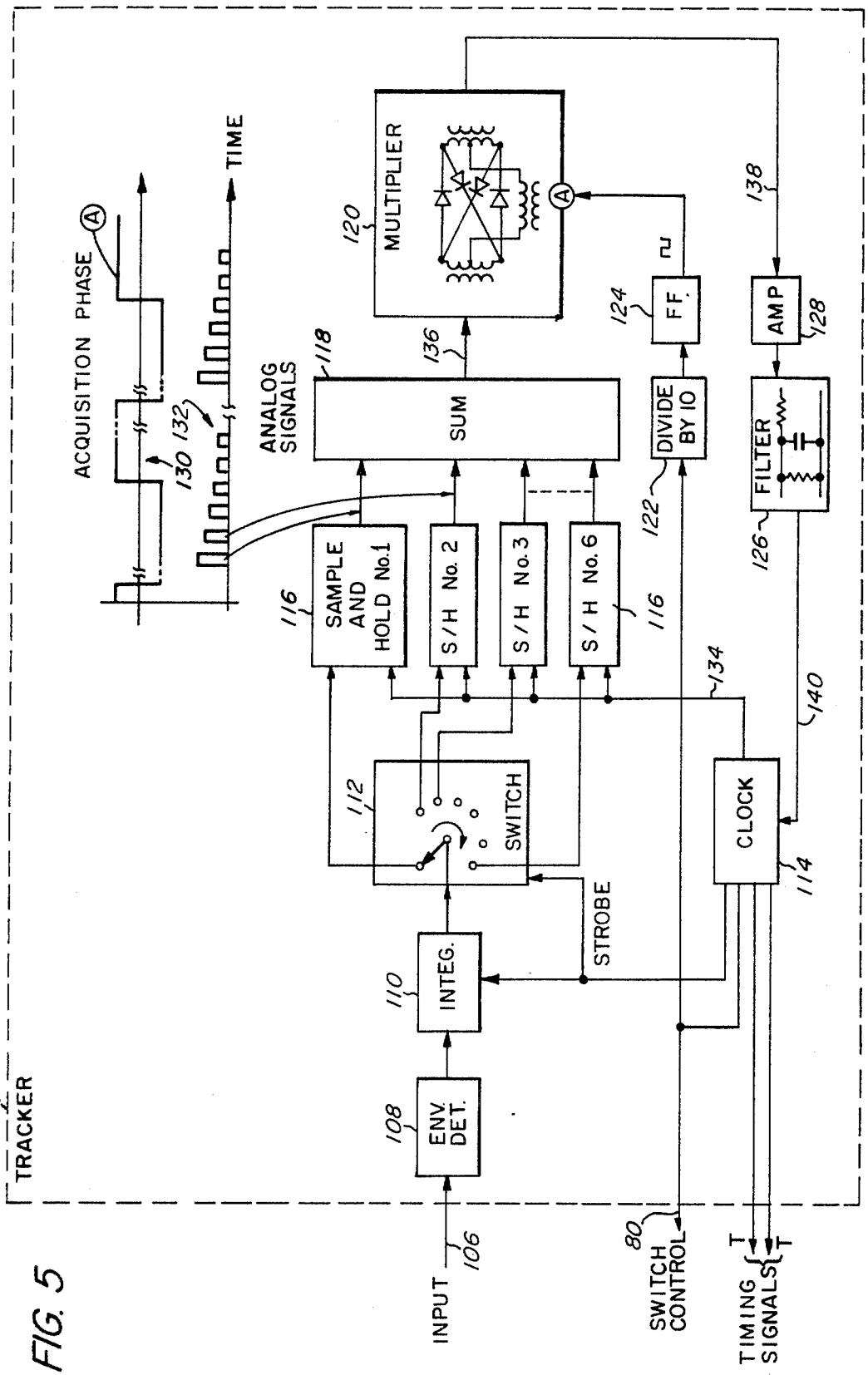
FIG. 5 is a block diagram of a tracker for tracking the occurrences of one code word of FIG. 1 for establishing a time base for synchronize the operation of the receiving portion of FIG. 1 with the transmitting portion of FIG. 1.

Referring now to FIG. 5, there is seen a block diagram of the tracker 52 of FIG. 1. The tracker 52 receives an input signal on line 106 from the first of the 20 filters 48 of FIG. 1 and provides the aforementioned switch control signal on line 80 to the switch 50. Also seen in FIG. 5 are the timing signals at the terminals T provided by the tracker 52 for the filters 48 and the demodulation system 54 which were previously seen in FIG. 1.

The tracker 52 comprises an envelope detector 108, an integrator 110, a switch 112, a clock 114, sample and hold circuits hereinafter referred to as sampler 116, a summer 118, a multiplier 120, a divider 122, a flip/flop 124, a filter 126 and an amplifier 128. The tracker 52 operates in a manner analagous to a range gate tracker employed in radar systems by applying a tracking gate, shown in graph 130, to a succession of analog signals shown in graph 132.

The input signal on line 106 is depicted by the portion of the bottom graph of FIG. 2 relating to filter number 1. The signal on line 106 appears periodically in synchronism with the occurrence of the first of the twenty code words produced by the coding system 64 of FIG. 1. The detector 108 detects the envelope of each of the signals on line 106 and applies these envelopes to the integrator 110. The integrated value of the envelope is coupled from the integrator 110 via the switch 112 selectively to each of the samplers 116. Each sampler 116 is strobed by a clock signal on line 134 from the clock 114. The clock 114 also provides strobing signals to the integrator 110 for clearing the integrator 110 and to the switch 112 for stepping its arm to the next contact. The strobing signals are provided by the clock 114 at a sufficiently high rate such that several samples of the signal on line 106 are obtained during an interval of time equal to the dispersion time of the channel 24 of FIG. 1.

By way of example, the tracker 52 is seen to have six samplers 116 for providing a succession of six samples as shown in the graph 132. With respect to the sequence of operations of the samplers 116 and the switch 112 and the integrator 110, a clock signal first appears on line 134 for operating a sampler 116 to sample a signal coupled thereto by the switch 112. Thereafter, a strobe signal is applied to clear or reset the integrator 110 and initiate a new integration. The strobe signal operates the switch 112 prior to the occurrence of the next clock pulse on line 134. Each sampler 116 holds its signal sample for a period of time approximately equal to the interval between clock pulses on line 134. Thereby, as seen in graph 132, a succession of samples representing the decreasing amplitudes of the successive output signals of the first filter 48 of FIG. 1 are presented to the summer 118. It is also noted that the automatic gain control feature of the amplifier 76 of the receiver 46 in FIG. 1 provides enough control only to compensate for very large variations in received signal amplitude so as to permit a variation in amplitude associated with attenuation along the different propagation paths of the channel 24 to be sensed by the tracker 52.

The summer 118 produces a waveform having the envelope of the pulse train depicted in the graph 132 and couples a signal having this waveform via line 136 to the multiplier 120. The multiplier 120 is depicted as having a transformer coupled diode bridge circuit often used in modulators. A signal having a waveform such as that depicted in graph 130 is applied to terminal A of the multiplier 120. The output signal of the multiplier 120 is coupled via line 138 to the amplifier 128 and has a positive or negative value depending on the temporal relationship of a transition point of the graph 130 and the centroid of a pulse train of the graph 132. The signal on line 138 is amplified by the amplifier 128 and filtered by the filter 126 to provide a signal on line 140 for controlling the speed of the clock 114. The filter 126 may be in the form of a low pass filter in which the cutoff frequency is lower than the repetition frequency of the pulse trains of the graph 132 so as to provide a substantially uniform control voltage on the line 140. Thus, the clock advances or retards the occurrence of the signal on line 80 so as to advance or retard the occurrence of the aforementioned transition point in the graph 130. The divider 122, which may employ a counter (not shown), divides the repetition frequency of switch control pulses appearing on line 80 by a factor of ten for triggering the flip/flop 124 to provide the tracking waveform at terminal A of the multiplier 120 at a repetition frequency equal to 1/20 the rate of pulses on line 80. In this way, the multiplier 120 provides an error signal which advances or retards the occurrence of the tracking gate at terminal A so as to align the centroid of the pulse frame on graph 132 with the corresponding transition point in the tracking gate signal at terminal A. In this way, timing signals produced by the clock 114 are synchronized to the reception of the first of the 20 code words at the filter system 66 of FIG. 1.

Figure 6:
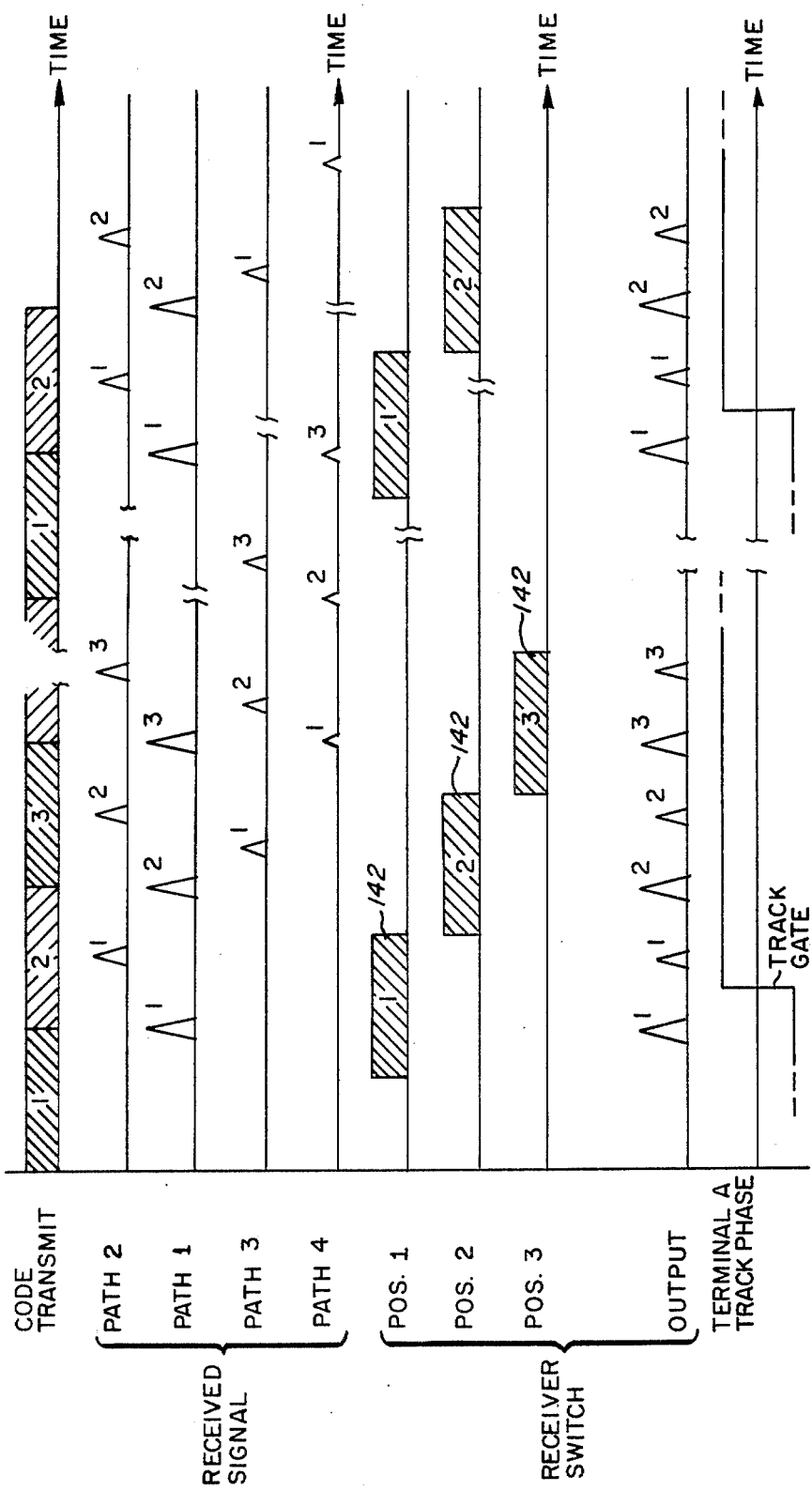
FIG. 6 is a timing diagram showing the relationship between the code transmissions of FIG. 1 and the times of occurrence of received signals in FIG. 1.

Referring now to FIG. 6, the graphs show respectively the temporal relationships between the transmission of the code words, the times of arrival of the direct transmission along path #1 of a code word and echoes thereof along other ones of the paths of the communication channel 22, successive positions of the receiver switch 50 producing windows for viewing output signals of the filters 48, and the position of the tracking gate at terminal A of the multiplier 120 when it has locked onto a centroid of the pulse train of the graph 132 of FIG. 5. In this respect, the graph 130 of FIG. 5 represents the acquisition phase of the tracker 52 while the bottom graph of FIG. 6 represents the tracking phase of the tracker 52.

The times of occurrence of the received signal propagating via paths numbered 1–4 are shown in relation to the times of transmission of the code words, the first three of the twenty code words being seen in the first graph of FIG. 6. The pulses shown on the graph for path #1 are the output pulses of the matched filters 48 of FIG. 1 and are seen to occur at the trailing edges of the corresponding transmitted code words. A similar set of pulses, but of somewhat reduced amplitude, are depicted for path #2, these pulses being delayed from the corresponding pulses of path #1 due to the increased propagation time of path #2. The corresponding pulses for signals propagating over paths #3 and #4 are further delayed and reduced in amplitude. The numbers depicted in or adjacent the waveforms of the received signal pulses correspond to the code words and their corresponding matched filters 48.

The blocks identified by the legend 142 identify the switch positions of the switch 50. The first position of the switch, wherein the first filter 48 is coupled to the demodulation system 54 of FIG. 1, is held from a time prior to the occurrence of the first of the output signals of the first filter 48 until a time prior to the time of occurrence of the first output signal of the second filter 48. The switch 50 is then strobed by the signal on line 80 to the second position wherein the second filter 48 is coupled to the demodulation system 54. The second position of the switch is held from a time prior to the occurrence of the first output signal of the second filter 48 until a time prior to the occurrence of the first output signal of the third filter 48. The successive positions of the blocks 142 in FIG. 6 thus demonstrate the successive positions of the switch 50 and the intervals of time during which the filters 48 are successively coupled to the demodulation system 54. The block 142, for the first position of the switch 50, is seen to be aligned with the transition point in the tracking gate of the bottom graph.

With reference also to the bottom graph of FIG. 2, it is noted that the filter output signal for the third path occurs, by way of example, after the second filter output signal for the first path. However, as seen in FIG. 6, the switch 50 has already stepped to the next filter 48 before the signal from the third path appears at the output of the previous filter 48 with the result that the window produced by the switch 50 sees only the filter output signals resulting from propagation along the first and second paths, the filter output signals resulting from propagation along the third and fourth paths being dropped. Thus, in the next to the last graph of FIG. 6 showing the output signal of the receiver switch 50, there appears two pulses for each of the filters 48, the envelope of these pulses being repetitive for each window. As has been noted hereinabove, the matched filter for each of the code words produces the same form of output signal so that a periodic pulse train of pulses having the same shape appears at the output of the switch 50. In addition, the phase of the carrier of the filter output signals is substantially constant for signals propagating along any one of the propagation paths in the presumed situation wherein the fading rate of the channel is slow compared to the symbol transmission rate. Thus, with the exception of the phase modulation of the data symbols produced by the modulator 42 of FIG. 1, there is a sufficient amount of phase coherence in the output pulses of the switch 50 to permit the generation of a reference in the demodulation system 54 for the detection of the data symbols.

Referring now to FIG. 7, there is seen a block diagram of demodulation system 54 of FIG. 1. Also seen in FIG. 7 are the lines 70, 82, 72A and 74A for coupling the demodulation system 54 to the filter system 66 and to the display 56. The demodulation system 54 is seen to have inphase and quadrature portions for detecting the inphase and quadrature modulations for presenting the first and second bits of the data. The demodulation system 54 comprises an oscillator 144, a 90° phase shifter 146, mixers 148 and 150, samplers 152 and 154, and delay units 156 and 158. The incoming signal on line 82 is the succession of matched filter output signals seen in graph 160 and previously seen in the bottom graph of FIG. 6, the pulses being on a carrier frequency of 5 KHz. The oscillator 144 provides a reference sinusoid to the mixer 148 for translating the 5 KHz signal to a 100 Hertz signal at the output of the mixer 148. Similarly, the oscillator 144 applies a reference via the phase shifter 146 to the mixer 150 for translating the 5 KHz input signal to a signal of 100 Hertz at the output of the mixer 150. Due to the 90° phase shift imparted by the phase shifter 146, the output signal of the mixer 150 is shifted 90° from the output signal of the mixer 148. It is also noted that since the matched filters 48 of FIGS. 1 and 3 strip off the code-word modulation, the only remaining phase modulation on line 82 is the four-phase modulation of the data symbols imparted by the modulator 42 of FIG. 1. Since the data symbols occur at the aforementioned rate of five symbols per second, the mixer output frequencies of 100 Hertz are of a sufficient magnitude to preserve the data symbol modulation. The demodulation system 54 includes a coherent reference filter 162, to be described hereinafter, which is conveniently implemented by digital techniques and, accordingly, the samplers 152 and 154 are employed to convert the analog output signals of the mixers 148 and 150 to digital signals. The samplers 152 and 154 are one bit samplers and function in the manner previously described with reference to the sampler 84 of FIG. 3.

The demodulation system 54 further comprises multipliers 164, 166, 168 and 170, integrators 172 and 174, comparators 176 and 178, reference signal sources 180 and 182, and a phase shifter 184. The multipliers 164 and 168, the integrator 172, the comparator 176, and the reference signal source 180 form the inphase portion of the demodulation system while the corresponding multipliers 166 and 170, integrator 174, comparator 178 and reference signal source 182 comprise the quadrature portion of the demodulation system 54. The inphase and quadrature portions of the demodulation system 54 function in a manner analogous to that taught for the corresponding portions of a demodulator described in FIG. 2 of the U.S. Pat. No. 3,939,407 which issued in the name of W. J. Bickford on Feb. 17, 1976. Guidelines for the demodulation of multiple (such as eight bit) phase shift keying are provided in a book entitled "Data Transmission" by W. R. Bennett and J. R. Davey which was published by McGraw-Hill Book Company in 1965.

With respect to the inphase portion, the output signal of the comparator 176 comprises a succession of digital pulses representing logic states of 0 and 1 which occur in a pattern following the pattern of digital pulses produced by the sampler 152. The output pulses of the sampler 152 are coupled to the multiplier 168 and are also coupled via the delay unit 156 to the multiplier 164. The delay unit 156 imparts sufficient delay to equalize the delay of signal propagation through the integrator 172 and the comparator 176 so that the output signal of the comparator 176 on line 72A arrives in step with the signal on line 188 from the delay unit 156. Multiplication of the two signals on the lines 72A and 188 by the multiplier 164 produces an inverse modulation so that the signal on line 190 is a succession of digital pulses in which the symbol data modulation is absent.

The output signal of the filter 162 on line 192 is also free of the data symbol modulation. The multiplier 168 multiplies the signal on line 192 by the signal on line 194 of the sampler 152 to produce an error signal on line 196. In view of the fact that the data symbol modulation is present on line 194 while no such modulation is present on line 192, the error signal on line 196 contains symbol data modulation. The integrator 172 integrates pulsations appearing in the error signal on line 196 to produce a filtered error signal on line 198. In view of a cophasal relationship between the signals on the lines 194 and 192, the inphase component of the data symbol modulation is enhanced by the integrator 172 while the quadrature component of the data symbol modulation is attenuated, or filtered out by the integrator 172; thus, only the inphase modulation need be considered in the error signal on line 198.

As each digital pulse produced by the integrator 172 increases in amplitude, the comparator 176 compares the amplitude of these pulses with the magnitude of the signal provided by the source 180. When the magnitude of a pulse signal on line 198 is greater than the magnitude of the reference, the comparator 176 produces a logic state of 1 on line 72A. Similarly, when the magnitude of the signal pulse on line 198 is less than that of the reference, the comparator 176 produces a logic state of 0 on line 72A. The integrator 172 is strobed by a timing signal from line 70, this timing signal being a succession of clock pulses having a sufficiently high repetition rate to clear the integrator 172 at the start of each of the digital pulses to be integrated.

The foregoing description of the inphase portion of the demodulation system 54 applies also to the quadrature portion of the demodulation system 54 so that a signal on line 74A from the comparator 178 is multiplied by the signal on line 202 from the delay unit 158 to produce on line 204 at the output of the multiplier 166 a succession of digital pulses which is free of the data symbol modulation. The signal on line 204 is shifted in phase by 90° from the signal on line 190 by virtue of the 90° phase shift produced by the phase shifter 184 to the reference signal on line 192. The signals on line 190 and 204 are summed together in a summer 206 of the reference filter 162 to produce a sample of reference signal on line 208, the reference signal on line 208 being based on the signal accumlated during a pulse of the matched filter output signals of graph 160.

The reference filter 162 further comprises a summer 210, a scaler 212 and a delay unit 214. The operation of the reference filter 162 has been described in FIGS. 2 and 4 of the U.S. Pat. No. 3,794,921 which issued in the name of M. G. Unkauf, the inventor of the instant invention, on Feb. 26, 1974. The feedback loop comprising the summer 210, the scaler 212 and the delay unit 214 employs positive feedback in which the gain factor is less than unity, the loop gain being provided by the scaler 212. The delay unit 214 imparts a delay equal to the duration of a data symbol of the source 36 of FIG. 1. Thus, with reference to the output signal of the receiver switch 50 as depicted in the penultimate graph of FIG. 6, the delay of one symbol duration provided by the delay unit 214 insures that the first ones of the pulses occurring in each of the windows are summed together, similar comments apply to the second and subsequent ones of the pulses in each of the windows. In view of the aforementioned teaching of the substantial coherence between these pulses, it is apparent that the feedback loop within the filter 162 produces the aforementioned coherent reference on line 192.

Figure 8:
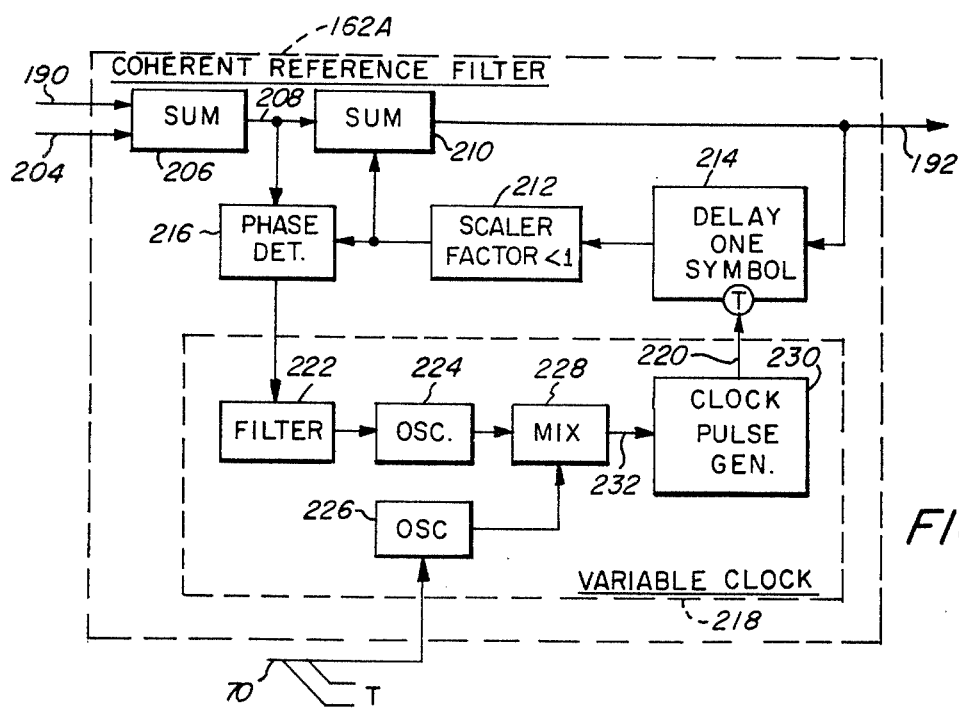
FIG. 8 is an alternative embodiment of a filter of FIG. 7 utilized in producing a reference signal.

Referring now to FIG. 8, there is seen an alternative embodiment of the coherent reference filter 162 of FIG. 7, this embodiment being identified by the legend 162A. The lines 190, 204 and 192 of FIG. 7 are also seen in FIG. 8. The summers 206 and 210, the scaler 212 and the delay unit 214 of FIG. 7 are also seen in FIG. 8. The feedback loop comprising the summer 210, the scaler 212 and the delay unit 214 of FIG. 8 functions in the same manner as does that loop in FIG. 7.

Additionally, the embodiment of FIG. 8 includes a phase detector 216 and a variable clock 218 which provides a variable rate of clock pulse signal on line 220 to terminal T of the delay unit 214 in lieu of the signal provided via line 70 in FIGS. 1 and 7. The variable clock 218 provides more precise tracking of the succeeding pulses coupled by the switch 50 of FIG. 1 to provide improved immunity to fading of the channel 24 of FIG. 1 as may occur when the transmitting and receiving antennas 22 and 26 are moving relative to each other, this being the situation in a communication from a moving ship to a stationary receiver.

The variable clock 218 of FIG. 8 is seen to comprise a filter 222, two oscillators 224 and 226, a mixer 228 and a clock pulse generator 230. In operation, the detector 216 detects phase differences between the reference signals on line 208 and that produced at the output of the scaler 212. The detected phase difference is then filtered by the filter 222, a low pass filter, to produce a smooth error signal which controls the oscillator 224. The oscillator 224 is driven by the filtered error signal to either increase or decrease the rate of clock pulses appearing on line 220 so as to null out the difference in phase detected by the detector 216. The oscillator 226 is driven at a constant rate by the timing signal from line 70 of FIGS. 1 and 7, the frequencies of oscillation of the oscillators 226 and 224 being summed together by the mixer 228 to produce a sinusoidal signal on line 232 which drives the generator 230 to produce clock pulses on line 220 at a frequency equal to the sum of the frequencies of the oscillators 226 and 224. Thereby, variations in phase between the signal on line 208 and the output of the scaler 212 alter the rate of the clocking of the delay unit 214 to increase or decrease the delay of the loop and thereby compensate the difference in phase. As a practical matter in implementing the delay, the delay unit 214 may comprise a shift register in which the digital pulses are shifted along the register in response to the clock pulses at terminal T.

Figure 9:
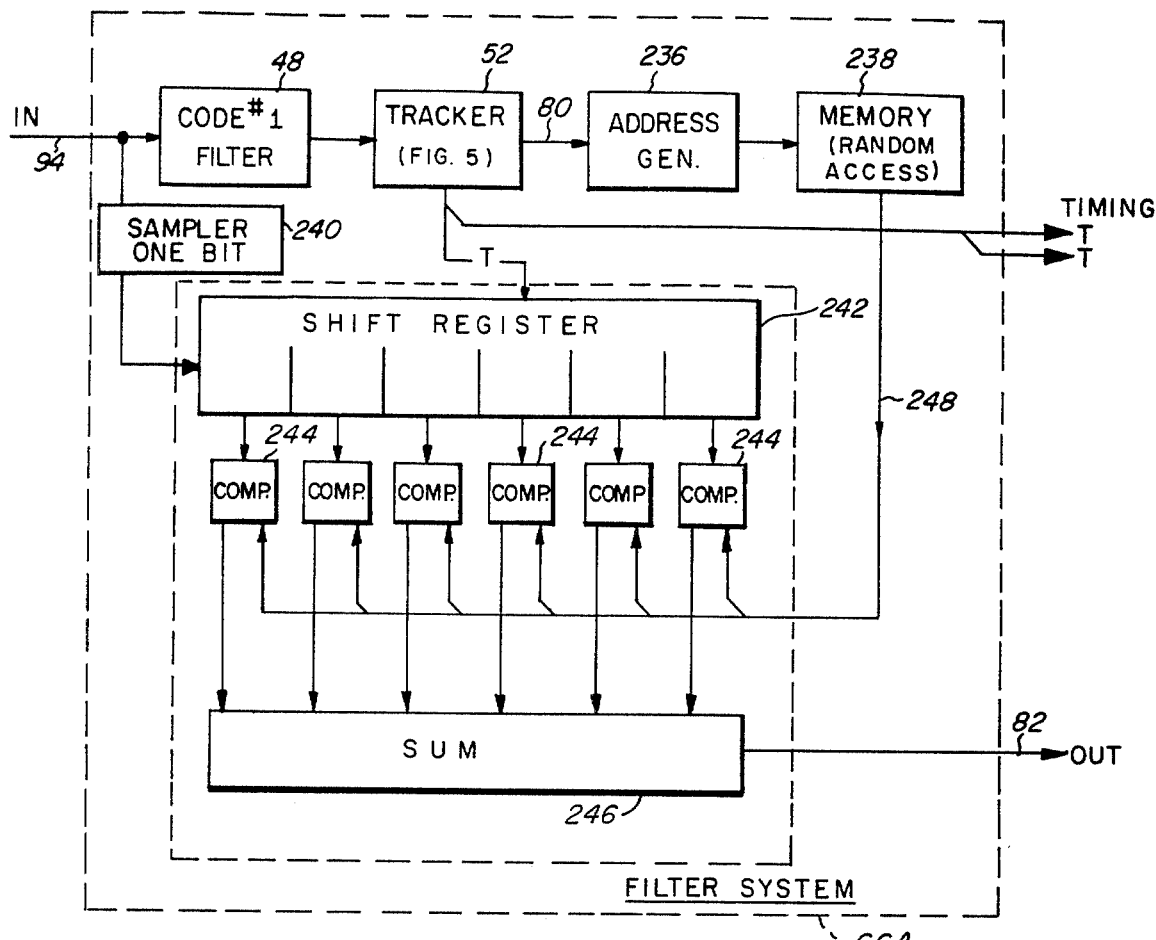
FIG. 9 is a block diagram of an alternative embodiment of the filter system of FIG. 1 employing a filter with variable characteristics, the characteristics being sequentially altered to correspond with the sequence of code words.

Referring now to FIG. 9, there is seen an alternative embodiment of the filter system 66 of FIG. 1, this embodiment being identified by the legend 66A. The filter system 66A is seen to comprise one of the matched filters 48 and the tracker 52 of FIG. 1, and is coupled via the lines 94 and 82, as shown in FIG. 1, respectively to the receiver 46 and the demodulation system 54. The filter system 66A uses a single filter wherein the characteristics, or filter function, is altered sequentially to match the succession of code words provided by the coding system 64 of FIG. 1. Thus, in lieu of the bank of twenty filters previously disclosed with reference to FIG. 1, the filter system 66A employs but a single filter 234 plus the aforementioned one of the filters 48 and the tracker 52 which are utilized in a manner to be described for altering the filter function.

The filter system 66A further comprises an address generator 236, a memory 238, a sampler 240, a shift register 242, complementing units 244 and a summer 246. The sampler 240 functions in the manner previously disclosed with reference to the sampler 84 of FIG. 3 and for the same purpose, namely, converting the analog signal on line 94 to a digital signal which may be readily processed by a shift register. While a multibit sampler and shift register may be employed in constructing the filter, in view of the fact that all of the data is phase modulated onto the carrier, a single bit sampler which preserves the zero crossings of the carrier is sufficient in the present situation. The shift register 242 and the summer 246 function in a manner analogous to that previously disclosed in FIG. 3 with reference to the shift register 86 and the summer 90. In lieu of the multipliers 88 of FIG. 3, the complementing units 244 are shown in FIG. 9 to demonstrate that with one bit sampling, multiplication by −1 is equivalent to taking the complement of the digit.

In operation, therefore, the tracker 52 tracks output signals of the filter 48 in the manner previously disclosed with reference to FIGS. 1 and 5 to produce control signals on line 80 for operating the address generator 236 in the manner previously disclosed for the operation of the switch 50 of FIG. 1. The address generator 236 addresses the memory 238 to produce a set of digits on line 248 for controlling respective ones of the complementing units 244. Thus, the multiplication factors, disclosed in FIG. 3 and implemented by the complementing operation in FIG. 9, are altered at the inception of each data symbol to provide a transversal filter, such as that disclosed previously in FIG. 3, having a filter function which is matched to the code word being received at the receiver 46 of FIG. 1. The window previously described with reference of the switch 50 of FIG. 1 and the graphs of FIG. 6 is now implemented by the filter system 66A which maintains a filter function during the duration of one code word, and then provides a second filter function during the duration of the succeeding code word. It is also noted that the construction of the filter system 66A utilizing an address generator and a memory for storing control functions may also be utilized in an alternative embodiment of the coding system 64 of FIG. 9 (not shown) wherein the bank of twenty code generators is replaced with a single code generator in which the summing and differencing of the various digits of the code are controlled by signals from the memory.

It is understood that the above described embodiments of the invention are illustrative only and that modifications thereof may occur to those skilled in the art. Accordingly, it is desired that this invention is not to be limited to the embodiment disclosed herein but is to be limited only as defined by the appended claims.

What is claimed is:

1. In a communication system wherein a sequence of code words is modulated on a carrier in synchronism with a sequence of message symbols for transmission of a message, a receiving system for reception of said message comprising:

a set of matched filters, individual ones of said filters being matched to the modulation of respective ones of said code words for extracting a symbol of said message;

means coupled to one of said filters for tracking the amplitudes of symbols extracted by said filter, said tracking means providing a synchronization signal designating the time of occurrence of a maximum amplitude of said symbols;

means synchronized to said tracking means for sequentially selecting symbols from each of said filters; and means coupled to said selecting means and including a feedback loop for filtering a sequence of symbols to recover said message, said feedback loop including an integrator and a comparator, said comparator signaling the occurrence of a symbol when the magnitude of an output signal of said integrator exceeds a predetermined reference value.

2. A system according to claim 1 wherein the symbols extracted from said matched filters are modulated on a carrier and wherein said feedback loop includes first multiplying means coupled to said comparator and to said selecting means for multiplying symbols of said matched filters by symbols of said comparator to produce a carrier reference, said feedback loop further comprising second multiplying means coupled between said selecting means and said integrator for multiplying symbols of said matched filters by said carrier reference for extracting symbols from said carrier.

3. A system according to claim 2 wherein said symbol filtering means further comprises a carrier filter connected between said first and said second multiplying means for filtering said carrier reference, said carrier filter including a feedback loop having a delay unit therein producing a delay of duration equal to the duration of one of said symbols.

4. A system according to claim 3 wherein said carrier filter further comprises means responsive to a phase difference between an input signal thereof and an output signal of said delay unit for adjusting the delay of said delay unit for variations in the propagation time of signals through said communication system.

5. A system according to claim 3 wherein said set of matched filters comprises a variable filter having a shift register and a memory, said variable filter utilizing selected signals of said memory to accomplish a multiplication of signals of said shift register to produce a filter matched to a specific one of said code word modulations, and wherein said selecting means comprises an address generator coupled to said tracking means for selectively addressing said memory to selectively produce signals for said multiplication corresponding to each of a sequence of said code words.

* * * * *